(12) United States Patent
Anderson, Jr. et al.

(10) Patent No.: US 11,254,512 B2
(45) Date of Patent: Feb. 22, 2022

(54) ALIGNMENT AND CONNECTION MECHANISM FOR COUPLING FRAME MEMBERS

(71) Applicant: Joy Global Underground Mining LLC, Warrendale, PA (US)

(72) Inventors: Charles M. Anderson, Jr., Paris, KY (US); Charles W. Watson, Paris, KY (US)

(73) Assignee: JOY GLOBAL UNDERGROUND MINING LLC, Warrendale, PA (US)

(*) Notice: Subject to any disclaimer, the term of this patent is extended or adjusted under 35 U.S.C. 154(b) by 0 days.

(21) Appl. No.: 16/800,722

(22) Filed: Feb. 25, 2020

(65) Prior Publication Data

US 2021/0261349 A1 Aug. 26, 2021

(51) Int. Cl.
*B65G 41/00* (2006.01)

(52) U.S. Cl.
CPC .................. *B65G 41/006* (2013.01)

(58) Field of Classification Search
CPC ..... B65G 41/006; B65G 21/10; B65G 19/287
USPC ................ 198/860.2, 735.2, 735.6
See application file for complete search history.

(56) References Cited

U.S. PATENT DOCUMENTS

| | | | | |
|---|---|---|---|---|
| 2,590,802 A | * | 3/1952 | Tramblay ............... | B65G 19/28 198/735.6 |
| 2,633,230 A | * | 3/1953 | Duncan ................ | B65G 19/287 198/735.6 |
| 3,300,031 A | * | 1/1967 | Dommann ............ | B65G 19/287 198/861.2 |
| 3,583,552 A | * | 6/1971 | Renwick .............. | B65G 19/287 198/735.6 |
| 3,822,011 A | * | 7/1974 | Braun .................. | B65G 19/287 198/735.2 |
| 3,944,061 A | * | 3/1976 | Braun .................. | B65G 19/287 198/735.2 |
| 4,467,914 A | | 8/1984 | Trammel et al. | |
| 4,813,747 A | * | 3/1989 | Klimeck ................ | E21C 29/02 299/43 |

(Continued)

FOREIGN PATENT DOCUMENTS

| | | | | |
|---|---|---|---|---|
| CA | 771001 A | | 11/1967 | |
| DE | 1024880 B | * | 2/1958 | ........... B65G 19/287 |

(Continued)

OTHER PUBLICATIONS

United Kingdom Intellectual Property Office Examination Report and Search Report for Application No. GB2101991.4 dated Sep. 9, 2021 (8 pages).

(Continued)

*Primary Examiner* — Mark A Deuble
(74) *Attorney, Agent, or Firm* — Michael Best & Friedrich LLP

(57) ABSTRACT

A machine includes a frame having a first frame member selectively coupled to a second frame member. The machine also includes an alignment and connection assembly including a protrusion coupled to the first frame member. The protrusion is receivable within the second frame member to align the first frame member with the second frame member. The alignment and connection assembly also includes a fastener coupled to the protrusion. The fastener is operable to secure the first frame member relative to the second frame member.

18 Claims, 4 Drawing Sheets

(56) References Cited

U.S. PATENT DOCUMENTS

| | | | | |
|---|---|---|---|---|
| 2004/0222067 A1* | 11/2004 | Klabisch | ............ | B65G 19/287 |
| | | | | 198/735.2 |
| 2014/0037452 A1 | 2/2014 | Komatsubara et al. | | |

FOREIGN PATENT DOCUMENTS

| | | | | | |
|---|---|---|---|---|---|
| DE | 1286489 | B   * | 1/1969 | ............ | B65G 19/287 |
| DE | 2826578 | A1 * | 1/1980 | ............ | B65G 19/287 |
| FR | 1174244 | A   * | 3/1959 | ............ | B65G 19/287 |
| FR | 2308007 | A1 * | 11/1976 | ............ | B65G 19/287 |
| GB | 226465 | A | 12/1924 | | |
| GB | 2096560 | A   * | 10/1982 | ............ | B65G 19/287 |
| GB | 2214151 | A   * | 8/1989 | ............ | B65G 19/287 |
| JP | S61108521 | U | 7/1986 | | |
| KR | 20080006526 | A | 1/2008 | | |

OTHER PUBLICATIONS

Danish Patent and Trademark Office Action for Application No. PA 2021 70077 dated Dec. 3, 2021 (8 pages).

* cited by examiner

ALIGNMENT AND CONNECTION MECHANISM FOR COUPLING FRAME MEMBERS

BACKGROUND

The present disclosure relates to a machine including selectively detachable frame members, and particularly to an alignment and connection mechanism for coupling frame members of a feeder conveyor.

SUMMARY

In one aspect, a machine includes a frame having a first frame member selectively coupled to a second frame member. The machine also includes an alignment and connection assembly including a protrusion coupled to the first frame member. The protrusion is receivable within the second frame member to align the first frame member with the second frame member. The alignment and connection assembly also includes a fastener coupled to the protrusion. The fastener is operable to secure the first frame member relative to the second frame member.

In another aspect, a machine includes a frame configured to support the machine above a surface. The frame includes a first frame member interfacing with a second frame member at a joint. The joint includes an alignment and connection assembly operable to selectively couple the first frame member to the second frame member. The alignment and connection assembly includes a protrusion coupled to the first frame member. The protrusion is receivable within the second frame member to align the first frame member with the second frame member. The alignment and connection assembly also includes a fastener operable to compress the joint and couple the first frame member to the second frame member in response to the fastener being tightened.

In yet another aspect, a machine includes a frame having a first frame member selectively coupled to a second frame member. The machine also includes a protrusion coupled to one of the first frame member or the second frame member. The protrusion is receivable within the other one of the first frame member or the second frame member to align the first frame member with the second frame member. The machine further includes a fastener positioned within one of the first frame member or the second frame member. The fastener is accessible within one of the first frame member or the second frame member to tighten the fastener and secure the first frame member relative to the second frame member.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and being practiced or being carried out in various ways. Also, it is to be understood that the phraseology and terminology used herein is for the purpose of description and should not be regarded as limiting. Terms of degree, such as "substantially," "about," "approximately," etc. are understood by those of ordinary skill to refer to reasonable ranges outside of the given value, for example, general tolerances associated with manufacturing, assembly, and use of the described embodiments.

Figure 1:
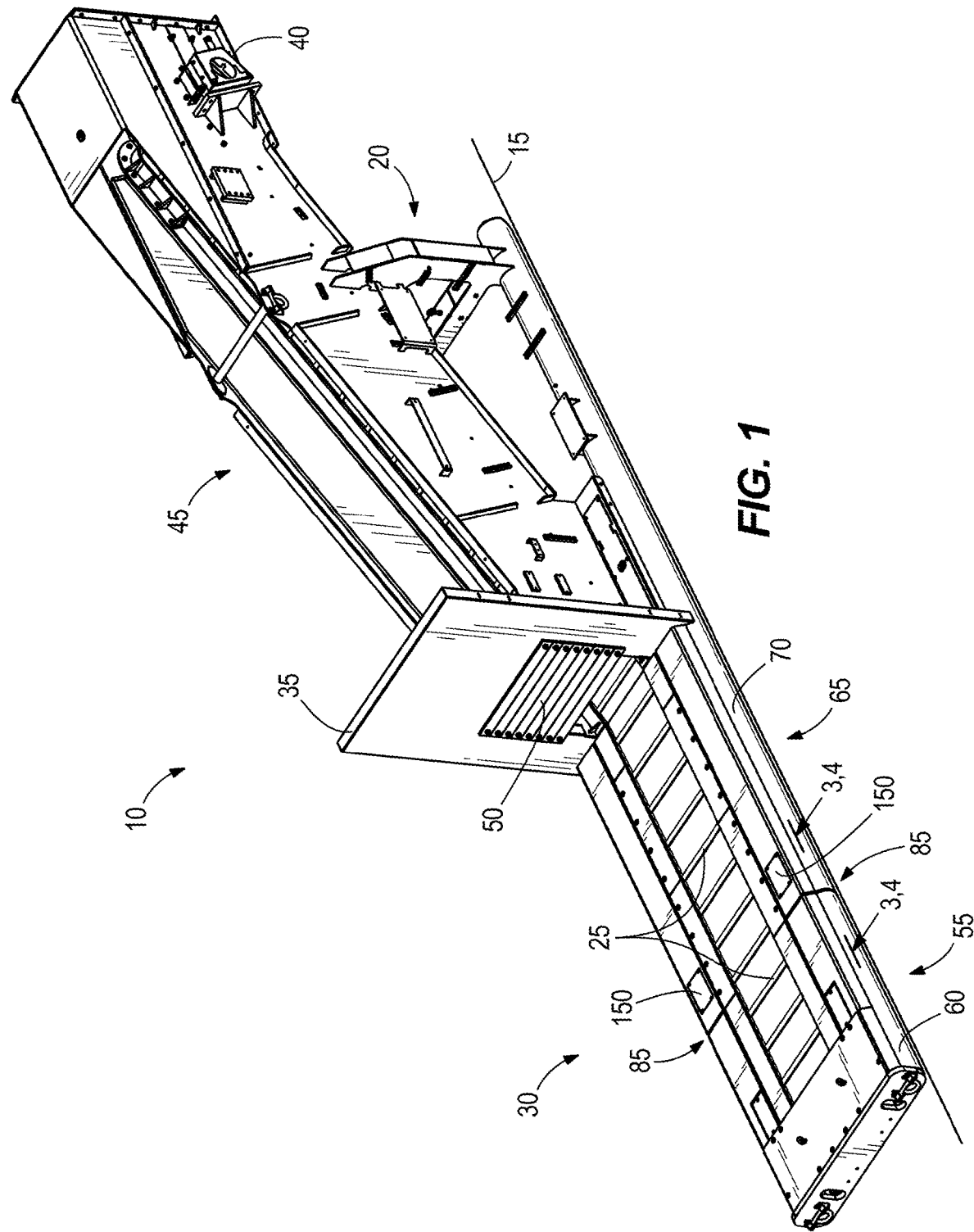
FIG. 1 is a perspective view of a feeder conveyor.

FIG. 1 illustrates a feeder 10 supported on a surface 15. The feeder 10 includes a frame 20 supporting a flight conveyor 25. The feeder 10 also includes a feeder portion 30 downstream of a partition 35 on which material (e.g., mined material, coal, etc.) is dumped or pushed as the conveyor 25 moves the material to a discharge end 40 of the feeder 10. The conveyor 25 also includes an inclined portion 45 between the partition 35 and the discharge end 40, and the discharge end 40 is vertically elevated relative to the feeder portion 30. As such, the feeder 10 is operable to drop the material from the discharge end 40 onto another conveyor (e.g., a belt conveyor) or a haul vehicle to be transferred away from the feeder 10. The partition 35, which is coupled to the frame 20, includes a barrier 50 that is adjustable to regulate the amount of material being moved from the feeder portion 30 to be discharged from the feeder 10 through the discharge end 40.

Figure 2:
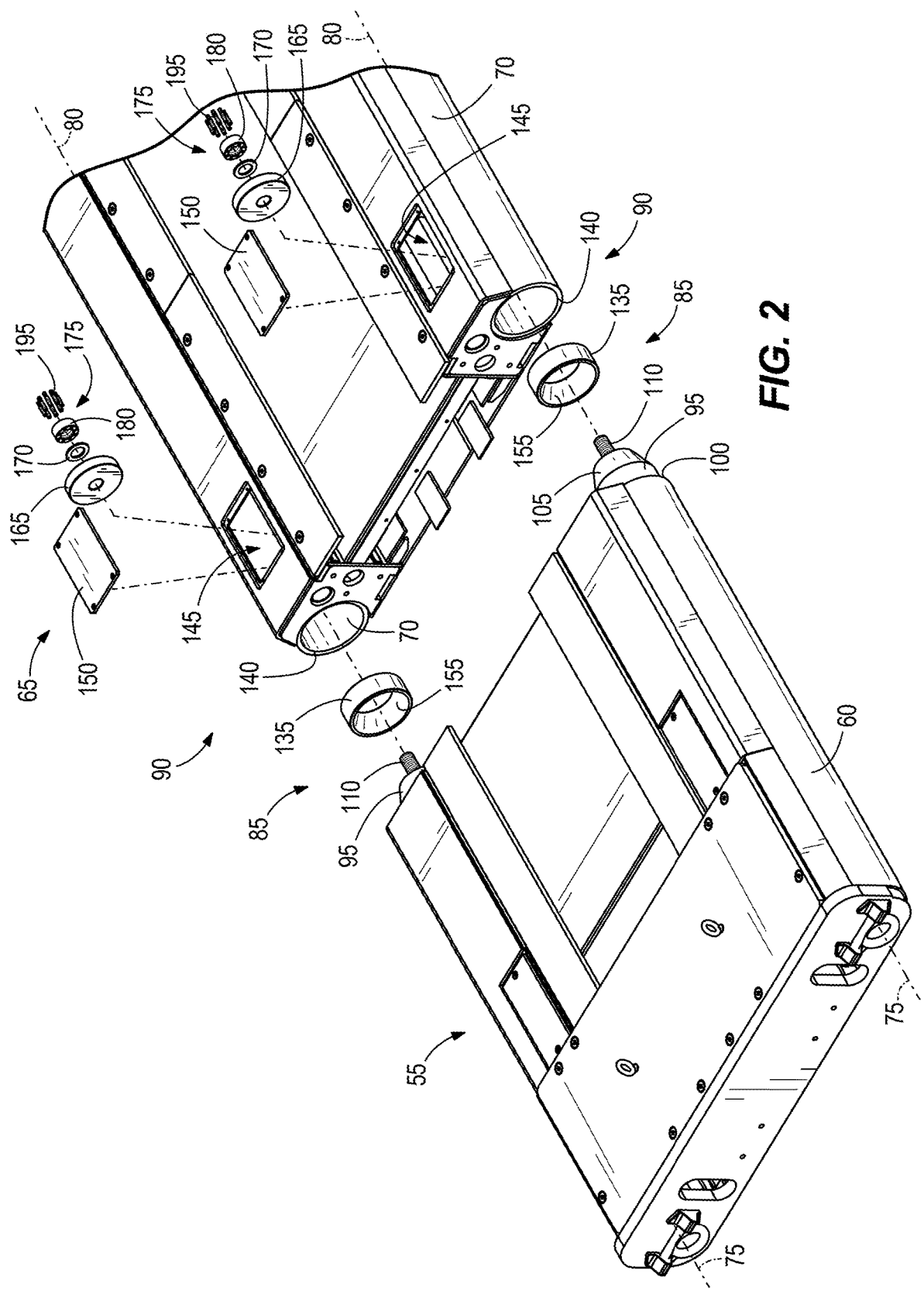
FIG. 2 is an exploded view of a portion of the feeder conveyor of FIG. 1 illustrating alignment and connection mechanisms positioned between frame members of the feeder conveyor.

With reference to FIGS. 1 and 2, the illustrated frame 20 includes portions that are capable of being uncoupled from one another to permit easier transportation and movement of the feeder 10 to desired sites rather than transporting and moving the feeder 10 as a whole. A first portion 55 of the frame 20 includes a pair of first frame members 60 (e.g., cylindrical tubes) and a second portion 65 of the frame 20 includes a pair of second frame members 70 (e.g., cylindrical tubes). Each of the first frame members 60 includes a first longitudinal axis 75 (FIG. 2) and each of the second frame members 70 includes a second longitudinal axis 80. The first frame members 60 interface with the second frame members 70 to provide joints 85 between the first portion 55 and the second portion 65. In other words, the joints 85 define breaks within the frame 20 that separate the frame 20 into the first portion 55 and the second portion 65. In other embodiments, each frame member 60, 70 can be differently configured (e.g., cuboid tube, solid cylindrical member, solid cuboid member, plate member, etc.).

Figure 3:
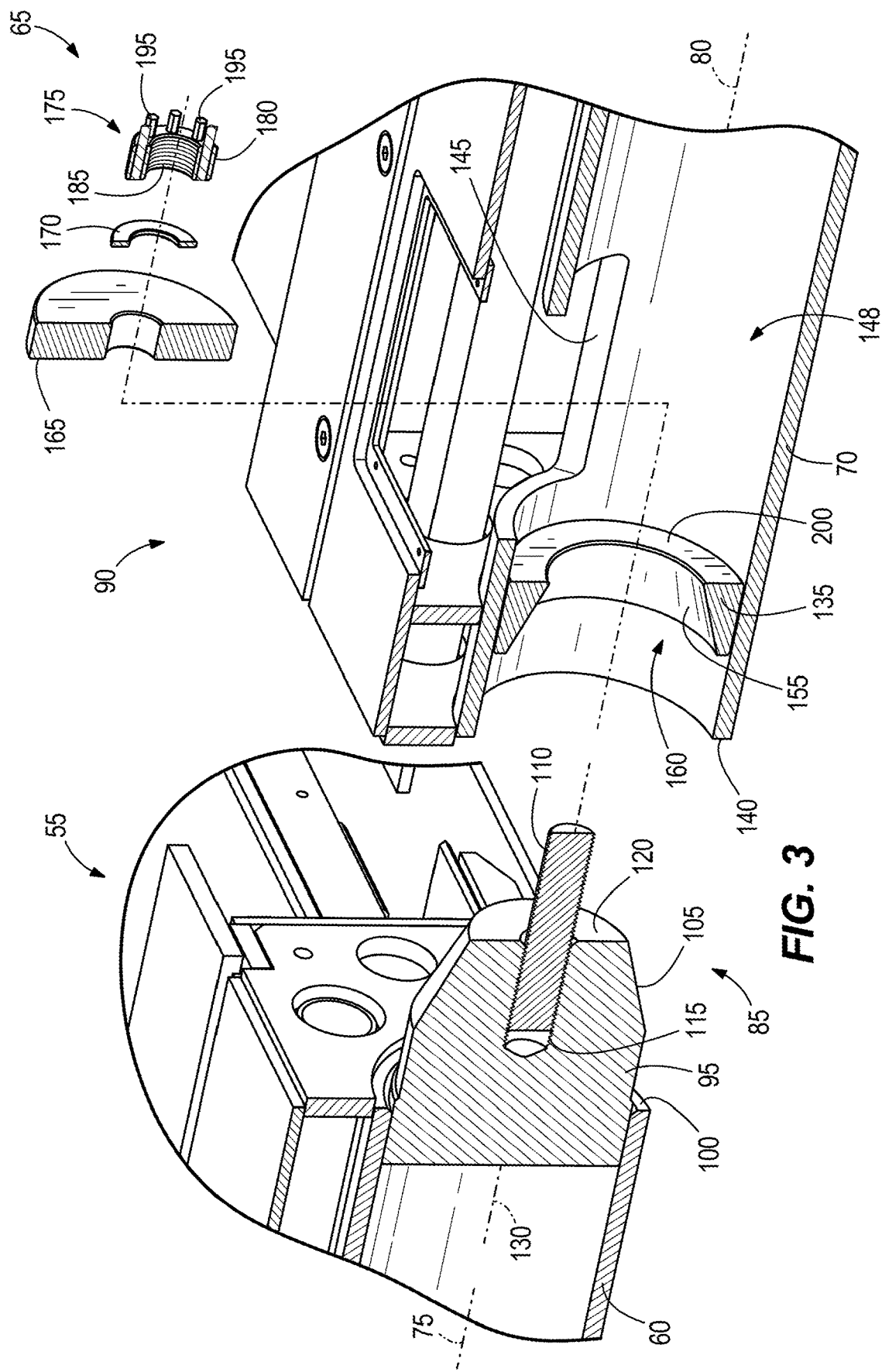
FIG. 3 is a cross sectional view of frame members of FIG. 1 in a decoupled state, viewed along section 3-3.
Figure 4:
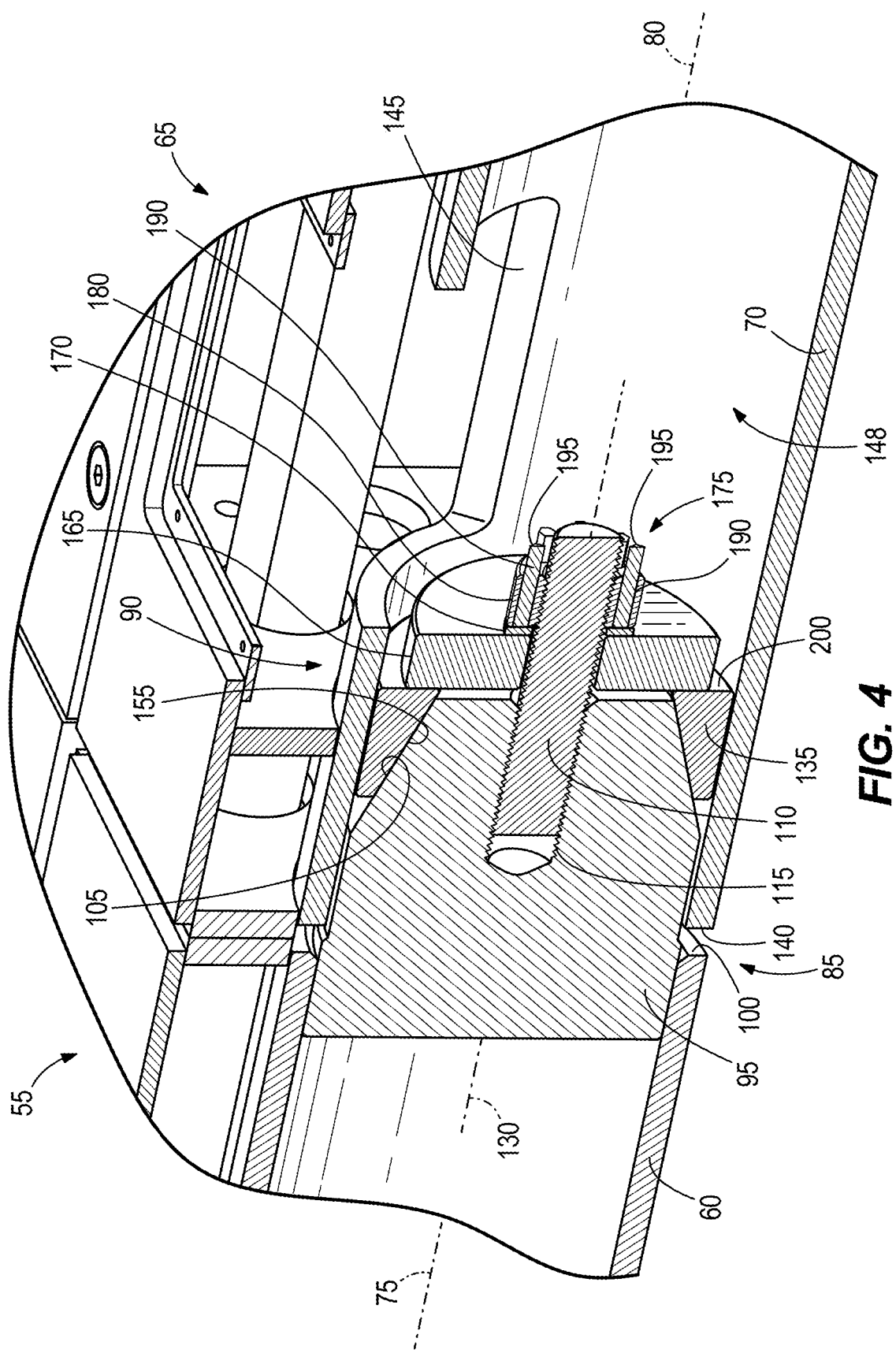
FIG. 4 is a cross sectional view of frame members of FIG. 1 in a coupled state, viewed along section 4-4.

As shown in FIG. 2, an alignment and connection mechanism 90 is positioned within each joint 85 to selectively align and couple the first portion 55 to the second portion 65 (FIG. 4). The alignment and connection mechanisms 90 are also operable to selectively disconnect the first portion 55 from the second portion 65 (FIG. 3). Each alignment and connection mechanism 90 is substantially the same as the others.

With reference to FIGS. 2 and 3, the alignment and connection mechanism 90 includes a protrusion 95 coupled to an end 100 of the first frame member 60. The protrusion 95 can be fixedly coupled or removably coupled to the first frame member 60 by, for example, welding the protrusion 95 to the first frame member 60, brazing the protrusion 95 to the first frame member 60, threading the protrusion 95 into the first frame member 60, etc. The illustrated protrusion 95 includes a tapered outer surface 105 and a threaded shaft 110 received within an aperture 115 of the protrusion 95 to extend beyond an end 120 of the protrusion 95. In the illustrated embodiment, a longitudinal axis 130 of the threaded shaft 110 is substantially coaxial with the first longitudinal axis 75 of the first frame member 60. In other embodiments, the first longitudinal axis 75 can be substantially perpendicular to the longitudinal axis 130 of the threaded shaft 110 (e.g., an L-shaped first frame member 60 including the threaded shaft 110 on the lower portion of the L-shaped member) or can be oblique relative to the longitudinal axis 130 of the threaded shaft 110.

With continued reference to FIGS. 2 and 3, the alignment and connection mechanism 90 also includes an alignment ring 135 coupled to the second frame member 70. In the illustrated embodiment, the alignment ring 135 is recessed within the second frame member 70 relative to an end 140. In particular, the alignment ring 135 is positioned between the end 140 of the second frame member 70 and an access opening 145 of the second frame member 70. The access opening 145 allows access to an interior 148 of the second frame member 70. As shown in FIG. 2, a cover 150 is selectively coupled to the second portion 65 of the frame 20 to selectively cover the access opening 145. In other embodiments, the cover 150 can be directly coupled to the second frame member 70 to selectively cover the access opening 145. The alignment ring 135 is fixedly coupled to the second frame member 70 by, for example, welding the alignment ring 135 to the second frame member 70, brazing the alignment ring 135 to the second frame member 70, threading the alignment ring 135 into the second frame member 70, etc. The illustrated alignment ring 135 includes a tapered inner surface 155 forming a central opening 160 of the alignment ring 135.

As shown in FIG. 3, the alignment and connection mechanism 90 further includes a retainer cap or first washer 165, a second washer 170, and a threaded nut 175. The illustrated threaded nut 175 includes a body 180 having central internal threads 185 that are sized to engage the threaded shaft 110 and threaded apertures 190 positioned around the central internal threads 185. Each threaded aperture 190 is sized to receive a threaded fastener 195 (e.g., a bolt).

The illustrated alignment and connection mechanism 90 provides a self-aligning and self-contained mechanism to align and couple the first and second portions 55, 65 together. With reference to FIGS. 3 and 4, the first frame member 60 is coupled to the second frame member 70 by inserting the protrusion 95 into the second frame member 70 for the tapered outer surface 105 of the protrusion 95 to engage the tapered inner surface 155 of the alignment ring 135. The slidable engagement between the tapered surfaces 105, 155 assists in centering the protrusion 95 within the second frame member 70, aligning the first longitudinal axis 75 of the first frame member 60 with the second longitudinal axis 80 of the second frame member 70. In other embodiments where coaxial alignment of the axes 75, 80 is not desired (e.g., the first frame member 60 is oblique to the second frame member 70 when assembled together), engagement between the protrusion 95 and the alignment ring 135 positions the frame members 60, 70 relative to each other to then be coupled together. In other words, the first frame member 60 automatically aligns with the second frame member 70 as the protrusion 95 is inserted into the alignment ring 135. Once the frame members 60, 70 are aligned, the frame portions 55, 65 can then be coupled together.

In particular, the threaded nut 175 couples the frame portions 55, 65 together. Once the cover 150 is removed from the second frame portion 65, the first washer 165, the second washer 170, and the threaded nut 175 can be moved through the access opening 145 to within the interior 148 of the second frame member 70 to be coupled to the threaded shaft 110. Specifically, the first washer 165 is received on the threaded shaft 110 to engage an end surface 200 of the alignment ring 135, the second washer 170 is received on the threaded shaft 110 to engage the first washer 165, and the threaded nut 175 is threaded onto the threaded shaft 110 to engage the second washer 170. As the threaded nut 175 is tightened onto the threaded shaft 110, the tapered outer surface 105 of the protrusion 95 is drawn tighter into engagement with the inner tapered surface 155 of the alignment ring 135. In other words, the joint 85 between the frame portions 55, 65 is compressed in response to the threaded nut 175 being tightened onto the threaded shaft 110. Accordingly, the frame portions 55, 65 are fixedly coupled together. The combination of the threaded shaft 110 and the threaded nut 175 is a fastener to secure the frame members 55, 65 together. In other embodiments, different types of fasteners can secure the frame members 55, 65 together (e.g., a clip coupled to the shaft 110, a bolt threaded into the protrusion 95, etc.).

The illustrated threaded nut 175 is a lock nut. Specifically, to inhibit the threaded nut 175 from loosening, the threaded fasteners 195 are tightened into the body 180 of the threaded nut 175 to engage the second washer 170. As a result, the threaded fasteners 195 provide a force on the body 180 in a direction away from the second washer 170 to lock the threaded nut 175 onto the threaded shaft 110.

In some embodiments, the second washer 170 can be omitted such that the threaded nut 175 directly abuts the first washer 165. In other embodiments, the alignment ring 135 and the first washer 165 can be formed as a single component fixed within the second frame member 70.

Once the feeder 10 is assembled, the feeder 10 is operable to remain stationary as material is moved onto the feeder portion 30 and the conveyor 25 moves the material toward the discharge end 40. The alignment and connection mechanisms 90 allow for the feeder 10 to be quickly disassembled to separately transport portions of the feeder 10 to a desired location. To prepare the feeder 10 to be transported, the covers 150 of the second portion 65 are removed allowing access to the respective threaded nut 175 through the access openings 145. Thereafter, the threaded fasteners 195 are loosened thereby allowing the body 180 of each threaded nut 175 to be removed from the threaded shaft 110. The first and second portions 55, 65 can then be disconnected from each other, allowing the first portion 55 to be loaded for transportation (e.g., loaded onto a semi-truck trailer) separately from the second portion 65. In some embodiments, the threaded shaft 110 can be removed from the protrusion 95 (e.g., once the first portion 55 is disconnected from the second portion 65) to protect the threaded shaft 110 from being damaged during movement and transportation of the first portion 55.

Although the alignment and connection mechanism is described above in the context of a feeder conveyor 10, it is understood that the mechanism may be incorporated on another type of machine (e.g., conveyor, sizer/crusher, etc.).

Although the disclosure has been described in detail with reference to certain preferred embodiments, variations and modifications exist within the scope and spirit of one or more independent aspects of the disclosure as described. Various features and advantages of the disclosure are set forth in the following claims.

The invention claimed is:

1. A machine comprising:
a frame including a first frame member selectively coupled to a second frame member; and
an alignment and connection assembly including
a protrusion coupled to the first frame member, the protrusion having a surface tapering in a direction along a longitudinal axis of the protrusion, the protrusion receivable within the second frame member for the tapered surface of the protrusion to engage the second frame member and align the first frame member with the second frame member, and
a fastener coupled to the protrusion, the fastener operable to secure the first frame member relative to the second frame member,
wherein the second frame member includes an alignment ring having an inner tapered surface, wherein the alignment ring is fixed within the second frame member, and wherein the tapered surface of the protrusion is an outer tapered surface that engages the inner tapered surface of the alignment ring to align the first frame member with the second frame member.

2. The machine of claim 1, wherein the fastener includes a threaded shaft fixedly coupled to the protrusion, and wherein the fastener also includes a threaded nut positioned within the second frame member when coupled to the threaded shaft to secure the first frame member relative to the second frame member.

3. The machine of claim 2, wherein the alignment and connection assembly includes a washer between the alignment ring and the threaded nut, and wherein the threaded shaft is received through the washer for the threaded nut to compress the washer against the alignment ring and prevent disengagement between the protrusion and the alignment ring.

4. The machine of claim 3, wherein the threaded nut includes a body, wherein the body includes a threaded aperture that receives a bolt, and wherein the bolt is tightened into the body to inhibit the threaded nut from loosening relative to the threaded shaft.

5. The machine of claim 1, wherein an interface between the first frame member and the second frame member defines a joint, and wherein the fastener is operable to compress the joint in response to the fastener being tightened.

6. The machine of claim 1, wherein the machine is a feeder conveyor including a conveyor configured to move material toward a discharge end of the feeder conveyor.

7. A machine comprising:
a frame configured to support the machine above a surface, the frame including a first frame member interfacing with a second frame member at a joint, the joint including an alignment and connection assembly operable to selectively couple the first frame member to the second frame member, the alignment and connection assembly including
a protrusion coupled to the first frame member, the protrusion receivable within the second frame member along an insertion axis to engage a surface of the second frame member and align the first frame member with the second frame member, the surface of the second frame member tapering along the insertion axis, and
a fastener operable to compress the joint and couple the first frame member to the second frame member in response to the fastener being tightened,
wherein the second frame member includes an alignment ring having the tapered surface of the second frame member, wherein the alignment ring is fixed within the second frame member, and wherein an outer tapered surface of the protrusion engages the tapered surface of the alignment ring to align the first frame member with the second frame member.

8. The machine of claim 7, wherein the fastener includes a threaded shaft fixedly coupled to the protrusion, and wherein the fastener also includes a threaded nut positioned within the second frame member when coupled to the threaded shaft to secure the first frame member relative to the second frame member.

9. The machine of claim 8, wherein the alignment and connection assembly includes a washer between the alignment ring and the threaded nut, and wherein the threaded shaft is received through the washer for the threaded nut to compress the washer against the alignment ring and prevent disengagement between the protrusion and the alignment ring.

10. The machine of claim 9, wherein the threaded nut includes a body, wherein the body includes a threaded aperture that receives a bolt, and wherein the bolt is tightened into the body to inhibit the threaded nut from loosening relative to the threaded shaft.

11. The machine of claim 7, wherein the machine is a feeder conveyor including a conveyor configured to move material toward a discharge end of the feeder conveyor.

12. A machine comprising:
a frame including a first frame member selectively coupled to a second frame member;
a protrusion coupled to one of the first frame member or the second frame member, the protrusion receivable within the other one of the first frame member or the second frame member along an insertion axis; and
a fastener positioned within one of the first frame member or the second frame member, the fastener accessible within one of the first frame member or the second frame member to tighten the fastener and secure the first frame member relative to the second frame member,
wherein the first frame member aligns with the second frame member along the insertion axis in response to tightening the fastener,
wherein the protrusion includes a threaded aperture, wherein the fastener includes a threaded shaft having a first end portion and a second end portion, wherein the first end portion is threadably secured within the threaded aperture such that the second end portion extends beyond the protrusion, wherein the fastener also includes a threaded nut positioned within the second frame member to engage the second end portion of the threaded shaft, and wherein the threaded nut is tightened on the threaded shaft to secure the first frame member relative to the second frame member.

13. The machine of claim 12, wherein the second frame member includes an opening to provide access to the threaded nut within the second frame member.

14. The machine of claim 13, wherein the second frame member includes an alignment ring having an inner tapered surface, wherein the alignment ring is fixed within the second frame member, and wherein an outer tapered surface of the protrusion engages the inner tapered surface of the alignment ring to align the first frame member with the second frame member.

15. The machine of claim 14, wherein the alignment and connection assembly includes a washer between the alignment ring and the threaded nut, and wherein the threaded shaft is received through the washer for the threaded nut to compress the washer against the alignment ring and prevent disengagement between the protrusion and the alignment ring.

16. The machine of claim 12, wherein an interface between the first frame member and the second frame member defines a joint, and wherein the fastener is operable to compress the joint in response to the fastener being tightened.

17. The machine of claim 12, wherein the machine is a feeder conveyor including a conveyor configured to move material toward a discharge end of the feeder conveyor.

18. The machine of claim 12, wherein access to the first end portion of the threaded shaft is blocked when the first end portion is threadably secured within the threaded aperture.

* * * * *